United States Patent
Kagemoto

(10) Patent No.: US 6,392,590 B1
(45) Date of Patent: May 21, 2002

(54) POSITIONING DEVICE AND METHOD CAPABLE OF REDUCING THE AMOUNT OF OPERATION

(75) Inventor: Tetsuya Kagemoto, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/478,529

(22) Filed: Jan. 6, 2000

(30) Foreign Application Priority Data

Jul. 7, 1999 (JP) .......................................... 11-192736

(51) Int. Cl.[7] .............................................. H04B 7/185
(52) U.S. Cl. ............................ 342/357.06; 342/357.01; 342/357.05; 701/207; 701/213; 701/214
(58) Field of Search .................................. 701/213, 214, 701/207, 215; 342/357.01, 357.02, 357.05, 353, 387, 465, 357.06, 357.03; 455/12.1, 13.2

(56) References Cited

U.S. PATENT DOCUMENTS 5,008,679 A * 4/1991 Effland et al. ............... 342/353
5,841,396 A * 11/1998 Krasner ................... 342/357.02
6,064,336 A * 5/2000 Krasner ................... 342/357.05

FOREIGN PATENT DOCUMENTS

| JP | 9-294115 | 11/1997 |
| JP | 10-107758 | 4/1998 |

* cited by examiner

Primary Examiner—Gertrude Arthur
(74) Attorney, Agent, or Firm—McDermott, Will & Emery

(57) ABSTRACT

A Positioning device includes a downconversion unit receiving positioning signals from satellites and converting the signals to an intermediate-frequency signal, and carrier search units using an output from the downconversion unit to search for a carrier wave of the received signals. The carrier search unit separates the received signal into in-phase and quadrate channel signals and spectrum-despreads them and then applies real Fast Fourier Transform to them. Of each frequency component, a signal corresponding to 0 Hz is corrected with a sum of all quadrate channel components to obtain a frequency difference between a local carrier and the carrier wave.

9 Claims, 6 Drawing Sheets

POSITIONING DEVICE AND METHOD CAPABLE OF REDUCING THE AMOUNT OF OPERATION

BACKGROUND OF THE INVENTION

1. Field of the Invention

The present invention relates to positioning devices used to determine the position of a user depending on a signal from a satellite.

2. Description of the Background Art

In recent years, a global positioning system or GPS which can receive a signal from an orbital satellite to determine the position of a user on the terrestrial ground with high precision, has been put to practical use. This GPS employs a GPS receiver simultaneously receiving signals transmitted from multiple GPS satellites, to detect a position.

A GPS satellite multiplies data to be transmitted (of 50 bps), referred to as a navigation message, by a pseudo random code (of 1.023 MHz, having a period of 1 ms) allotted uniquely to the GPS satellite and sends it via a carrier (a carrier wave of approximately 1.5 GHz) to transmit a signal. While the carrier's frequency is common to all GPS satellites, data to be transmitted is each spectrum-spread by a unique pseudo random code and thus do not interfere with each other.

A GPS receiver simultaneously receives signals transmitted from multiple GPS satellites and spectrum-despreads a signal from each GPS satellite to extract a navigation message. "Despread" herein means demodulation in a spread spectrum system. In general, up to 8 to 16 satellites can be simultaneously subjected to such signal processing. In spectrum-despreading, a received signal is multiplied by a carrier wave and a pseudo random code identical to those used in the multiplication for the transmission in the GPS generation and the resultant multiplication is integrated over a predetermined period of time to derive a correlation value. It should be noted that the integration time above is approximately one period of the pseudo random code (1 ms).

A pseudo random code and a carrier used in the multiplication to despread a spectrum each have an uncertainty, as described below:

(1) the phase of the pseudo random code (2) the frequency of the carrier if a pseudo random code generated in a receiver is offset in phase from that multiplied in the received signal, the receiver cannot extract a navigation message from the carrier. Since it is difficult to predict a phase of a pseudo random code, in general an uncertain region corresponds to the entire phase of the pseudo random code.

The uncertainty of a carrier frequency is attributed to two factors, i.e., the Doppler effect resulting from the movement of a GPS satellite and a frequency error of an oscillator internal to a receiver. The effect of the Doppler effect on a carrier frequency can reach as high as 5 kHz. However, the magnitude thereof can be predicted to reduce any uncertain region to less than 5 kHz. The error of the internal oscillator significantly depends on the characteristics of the oscillator. If an oscillator with temperature compensation is used, the error is on the order of at most 1 kHz. Otherwise, the effect on a carrier frequency can reach as high as approximately 100 kHz.

Accordingly, in despreading a spectrum in a GPS receiver a two-dimensional, uncertain region resulting from the above two uncertainties must be entirely searched until a navigation message is obtained. The region is searched by obtaining a correlation value for each searching point determined depending on a specific pseudo random code phase and a specific carrier frequency, and comparing the obtained correlation value with a preset threshold value.

The interval between searching points must be no more than twice a maximal offset acceptable for capturing a signal, and it is approximately 0.5 $\mu$sec for a pseudo random code phase and approximately 1 kHz for a carrier frequency. Thus if an uncertain region of a carrier frequency is 10 kHz, the number of searching points is represented by the following expression:

$$((1 \text{ ms}/0.5 \text{ }\mu\text{sec}))\times(10 \text{ kHz}/1 \text{ kHz}))=20,000$$

Thus when an integration time of 1 msec is provided at one searching point searching the entirety of the uncertain region requires approximately 20 seconds.

It should be noted, however, that if there is a significant error in an oscillation frequency (a local oscillation frequency) of an internal oscillator and an uncertain region of a carrier frequency expands, then the time required for searching the region is accordingly increased.

A method employing Fast Foulier Transform (FFT) allows rapid search when an inexpensive oscillator without temperature compensation is used and a significant error is introduced in a local oscillation frequency. FFT allows a true carrier frequency to be estimated among a range of frequencies.

More specifically, correlation values obtained through the integration are stored and used as an input to perform a FFT. It should be noted that the number of the correlation values stored is equal to the point count of the FFT performed. If a pseudo random code is in phase and the difference between a true carrier frequency and an internal carrier's frequency (a local oscillation frequency) falls within a range searched via the FFT, the frequency corresponding to the difference has a peak and the true carrier frequency can thus be estimated.

Important factors in a method employing such FFT are the frequency range which the FFT can search, and the precision with which the FFT can search the frequency. A range of frequencies which can be searched is the same as a sampling frequency and is widen as an integration time required to obtain one correlation value is reduced.

A searching precision is obtained by dividing a sample frequency by a point count and is thus enhanced as the point count increases. As has been described above, carrier frequency searching requires a precision of approximately 1 kHz. Accordingly the time corresponding to a single period thereof or 1 msec divided by a point count may be adopted as an integration time to obtain one correlation value.

For example, a point count of 32 provides an integration time of approximately 31 $\mu$sec and FFT can search a frequency range of 32 kHz at one time.

The range that can be searched is widen if the point count is further increased. Because of a characteristic of a pseudo random code, however, with too short an integration time a correct correlation cannot be obtained and the sensitivity can thus be deteriorated.

FIG. 6 is a schematic block diagram showing a configuration of a conventional GPS receiver, particularly of a carrier search unit 2000 disposed to search a carrier.

In the figure, a downconversion unit (not shown) downconverts a received signal to a signal of approximately several MHz. The downconverted signal is then sampled by an A-D converter (not shown) to provide a 2-bit digital signal which is input to a signal input port 10.

A local carrier oscillator 20 generates an in-phase carrier and an quadrate carrier which have a designated frequency and are offset in-phase from each other by 90°. The carriers are generated with a precision of two bits. Carrier multipliers 31 and 32 multiply an input signal by the in-phase and quadrate carriers, respectively. Carrier multipliers 31 and 32 multiply the 2-bit input signal by the in-phase or quadrate carrier and output a 4-bit signal.

A code generator 40 generates a pseudo random code corresponding to a GPS satellite. Code multipliers 51 and 52 multiply the outputs from carrier multipliers 31 and 32, respectively, by the pseudo random code from code generator 40.

Integrators 61 and 62 receive outputs from code multipliers 51 and 52, respectively, and integrate them, respectively, over a predetermined period of time.

A memory 70 stores integrals obtained via integrators 61 and 62.

A frequency difference calculation unit 80 follows the procedure described below to perform an FFT depending on the integrals stored in memory 70 to obtain a frequency difference between a carrier included in an input signal and a local carrier generated by local carrier generator 20.

Carrier search unit 90 uses the frequency difference from frequency difference calculation unit 80 to control the local carrier frequency generated by carrier generator 20 to provide carrier control.

Operation of conventional carrier search unit 2000 will now be described.

The A-D converter in the downconversion unit typically has a sampling frequency of 4.092 MHz, and local carrier generator 20, carrier multipliers 31 and 32, code generator 40, code multipliers 51 and 52, and integrators 61 and 62 operate according to the clock of 4.092 MHz.

Local carrier generator 20 outputs 2-bit, in-phase and quadrate carriers for each cycle. Carrier multipliers 31 and 32 multiply a 2-bit input signal by the 2-bit, in-phase or quadrate carrier for each cycle to output a 4-bit signal. Code generator 40 generates a 1-bit code associated with a specific GPS satellite for each cycle. The code generator 40 generates a code respectively representing ±1 for each cycle.

Code multipliers 51 and 52 multiply the 4-bit input by the 1-bit code for each cycle to output a 4-bit signal. For a code of +1, code multipliers 51 and 52 output a 4-bit input as it is. For a code of −1, code multipliers 51 and 52 invert a 4-bit input before the input is output.

Integrators 61 and 62 has an integration time of approximately 31 μsec (128 cycles). At the start of the integration time, integrators 61 and 62 have their accumulators initialized to zero and integrators 61 and 62 add a 4-bit input to the accumulators for each cycle. At the end of the integration time, integrators 61 and 62 write the accumulators' values to memory 70.

When 32 integrals for each of in-phase and quadrate channels are stored in memory 70, frequency difference calculation unit 80 reads the values of the integrals to perform an FFT. In performing the FFT, the integrals for the in-phase channel and those for the quadrate channel are regarded as a real part and a imaginary part, respectively, of a time-region signal to perform a 32-point complex FFT.

More specifically, when an integral for an in-phase channel and that for an quadrate channel are represented as I(n) and Q(n), respectively, wherein n represents a natural number and n=0, 1, 2, . . . , 31, then a signal of a frequency region is obtained as below:

$$X(n) = \Sigma(I(k) + jQ(k))\exp(-jkn/32)$$

wherein j represents an imaginary unit and Σ represents summation with respect to k from k=0 to k=31. (Hereinafter Σ will be used as described above.)

With a signal of a frequency range thus obtained, X(0) to X(15) correspond to 0 kHz to 15 kHz and X(17) to X(31) correspond to −15 kHz to −1 kHz. To calculate a power at each frequency of the signal of a frequency region thus obtained, frequency difference calculation unit 80 calculates the sum of the square of a real part and that of an imaginary part for each frequency. That is, each frequency has a power calculated as below:

$$P(n) = |X(n)|^2$$
$$= \{\mathrm{Re}(X(n))\}^2 + \{\mathrm{Im}(X(n))\}^2$$

If an obtained power has a maximal value exceeding a predetermined threshold value, frequency difference calculation unit 80 regards the frequency with the maximal power as the frequency difference between a carrier of an input signal and a local carrier generated in the receiver and transmits the obtained frequency difference to carrier search unit 90.

Carrier search unit 90 adds the frequency difference from frequency difference calculation unit 80 to a frequency value currently set in carrier generator 20 to re-set a carrier frequency generated by carrier generator 20.

While the conventional GPS receiver described above can search a wide range of frequencies, it disadvantageously has a significant burden on the FFT process. Since a carrier must be searched for until a phase of a pseudo random code and a carrier frequency match, the conventionally configured GPS receiver operating at a typical frequency must be capable of performing an FFT for each millisecond. This means that if software is used to provide the process described above a CPU is required which has a capacity of approximately several MIPS. Furthermore, if a carrier is searched for with multiple channels simultaneously, the MIPS needs to be multiplied by the number of the channels.

SUMMARY OF THE INVENTION

One object of the present invention is to provide a positioning device capable of reducing a process provided to search for a carrier.

Briefly speaking, the present invention is a positioning device receiving positioning signals from multiple satellites to derive positional information, including a downconversion unit, a carrier search unit and a positional information deriving unit.

The downconversion unit receives positioning signals from multiple satellites and converts the signals to a predetermined intermediate frequency (IF) signal.

The carrier search unit receives an output from the downconversion unit and searches for a frequency of a carrier wave of the signals from the multiple satellites.

The carrier search unit includes a carrier generator, a signal extraction unit, a storage circuit, a frequency difference calculation unit and a carrier search control unit.

The carrier generator generates an in-phase local carrier signal and an quadrate local carrier signal. The signal extraction unit responds to a signal from the downconversion unit and signals output from the carrier generator by separating an in-phase channel signal corresponding to the in-phase local carrier signal and an quadrate channel signal corresponding to the quadrate local carrier signal to despread a spectrum.

First and second integrators each receive an output from the signal extraction unit and integrate it for a designated integration time. From the first and second integrators the storage circuit receives and holds multiple integrals each calculated for an integration time.

The frequency difference calculation unit derives a frequency difference between a carrier frequency included in a signal from the downconversion unit and a local carrier frequency. The frequency difference calculation unit derives the frequency difference by i) providing Fast Fourier Transform for the integration stored in the storage circuit and corresponding to the in-phase channel signal, ii) correcting a direct-current component of frequency components obtained by the Fast Fourier Transform using the integration stored in the storage circuit and corresponding to the quadrate channel signal, and iii) selecting a frequency component with a maximum power among the frequency components.

The carrier search control unit uses the frequency difference to update the frequency of the local carrier signals generated by the carrier generator and search for the frequency of the carrier wave.

The positional information deriving unit uses an output from the carrier search unit to extract navigation messages from the signals from the multiple satellites to derive positional information.

Preferably when a predetermined threshold value is exceeded by the sum of a predetermined number of integrals stored in the storage circuit and corresponding to the in-phase channel signal that are each squared and then together summed up and a predetermined number of integrals stored in the storage circuit and corresponding to the quadrate channel signal that are each squared and then together summed up, the frequency difference calculation unit performs Fast Fourier Transform depending on the integrals stored in the storage circuit and corresponding to the in-phase channel signal and uses the sum of all integrals stored in the storage circuit and corresponding to the quadrate channel signal as an imaginary part of a direct-current component of frequency components resulting from the Fast Fourier Transform, to calculate a power for each frequency component to provide a frequency difference based on the frequency with the maximal power.

In another aspect of the present invention a positioning method receiving positioning signals from multiple satellites to derive positional information includes the steps of: receiving positioning signals from multiple satellites and converting the signals to a predetermined intermediate frequency (IF) signal; multiplying the IF signal by an in-phase carrier signal and an quadrate carrier signal to separate an in-phase channel signal corresponding to an in-phase local carrier signal and an quadrate channel signal corresponding to an quadrate local carrier signal; despreading a spectrum of each of the in-phase and quadrate channel signals; integrating each signal having a despread spectrum for a designated integration time, providing Fast Fourier Transform for the integration corresponding to the in-phase channel signal, correcting a direct-current component of frequency components obtained by the Fast Fourier Transform using the integration corresponding to the quadrate channel signal, selecting a frequency component with a maximum power among the frequency components to provide said frequency difference, using the frequency difference to update the frequency of the in-phase and quadrate cannel signals to search for the frequency of the carrier wave; and using a searched carrier wave to extract navigation massages from the signals sent from the multiple satellites to derive positional information.

Thus a main advantage of the present invention is that real Fast Fourier Transform can be provided to reduce the amount of a frequency difference calculation process.

Another advantage of the present invention is that the phasing of an input signal and a generated code signal can be previously evaluated prior to a process to reduce the amount of a frequency difference calculation process.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
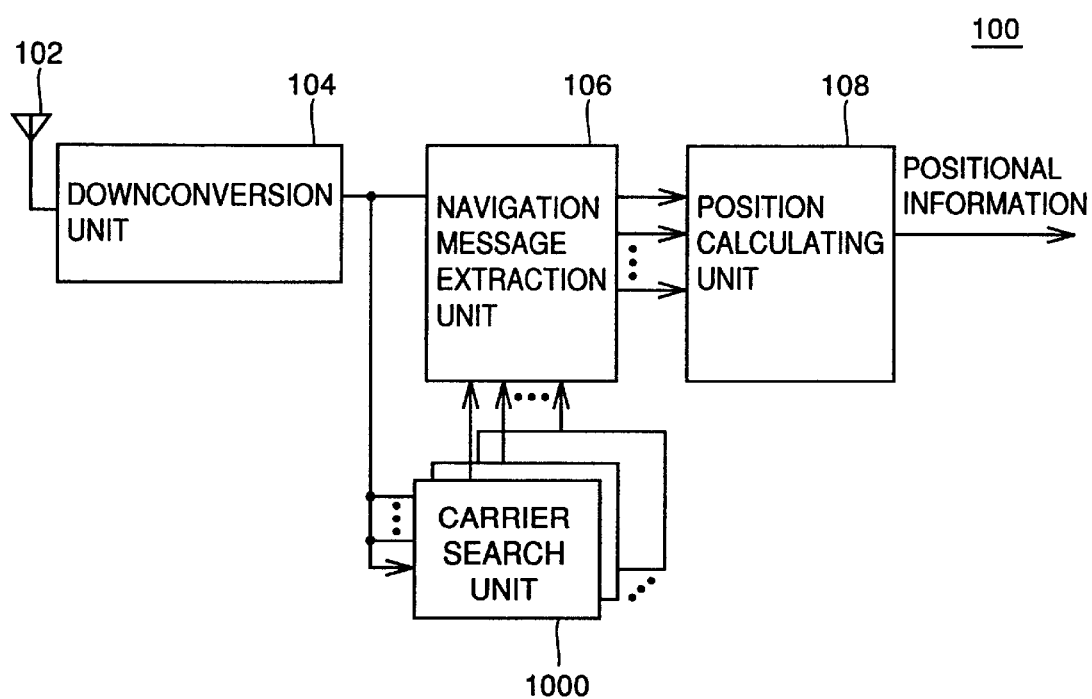
FIG. 1 is a schematic block diagram illustrating a configuration of a GPS receiver of a first embodiment of the present invention.

FIG. 1 is a schematic block diagram illustrating a configuration of a GPS receiver 100 of a first embodiment of the present invention.

Referring to FIG. 1, GPS receiver 100 includes an antenna 102 receiving a signal from a GPS satellite, a downconversion unit 104 receiving the signal from antenna 102 and converting the signal to a signal of a predetermined intermediate frequency (IF), e.g., of severalMHz, a carrier search unit 1000 receiving a signal from downconversion unit 104 to each search for a carrier from a specific GPS satellite, a navigation message extraction unit 106 receiving a local carrier from carrier search unit 1000 to extract a navigation message from each GPS satellite, and a position calculating unit 108 receiving the navigation message from the navigation message extraction unit to derive positional information on the GPS receiver.

Figure 2:
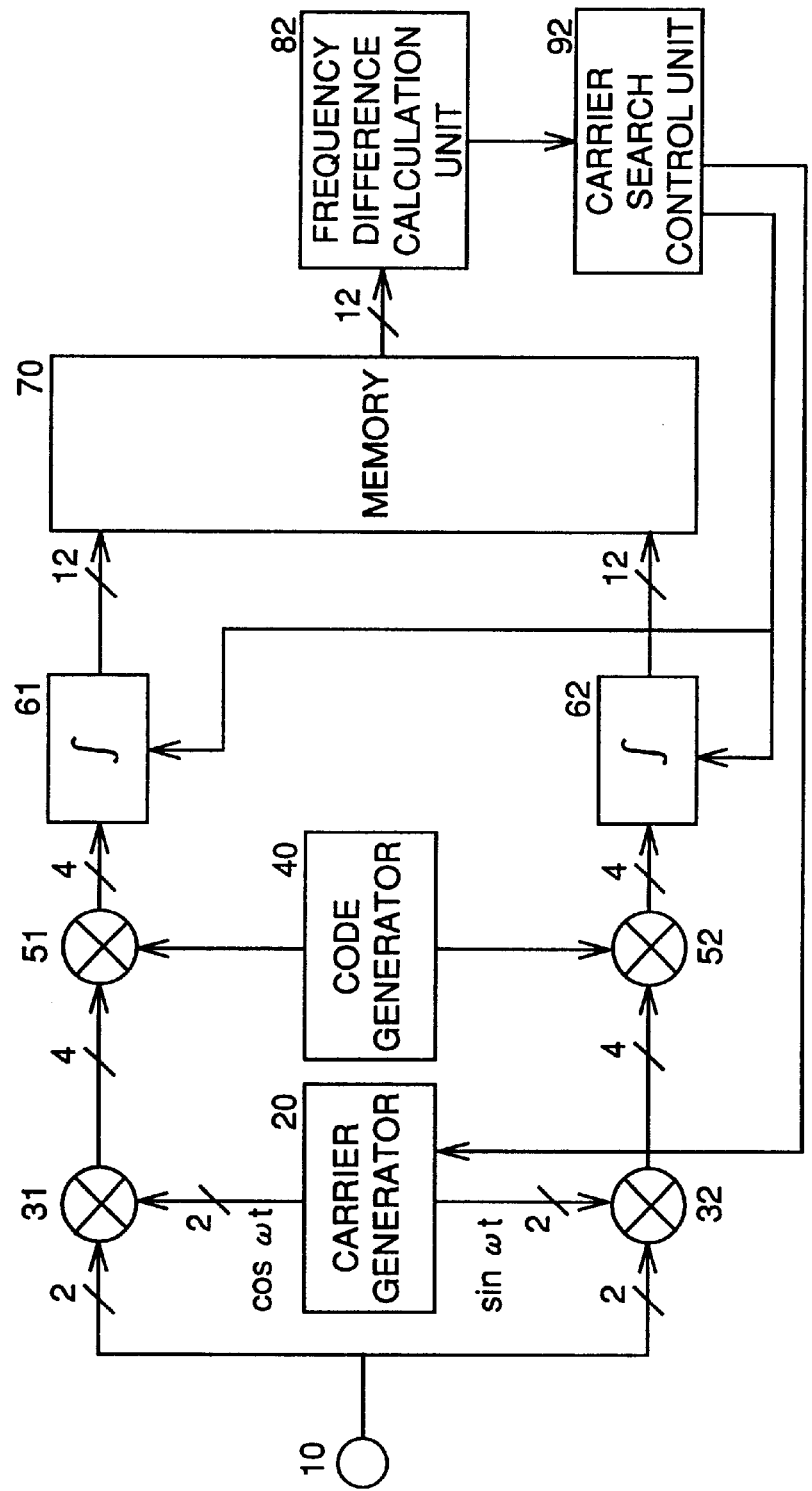
FIG. 2 is a schematic block diagram illustrating a configuration of a carrier search unit 1000 shown in FIG. 1.
Figure 6:
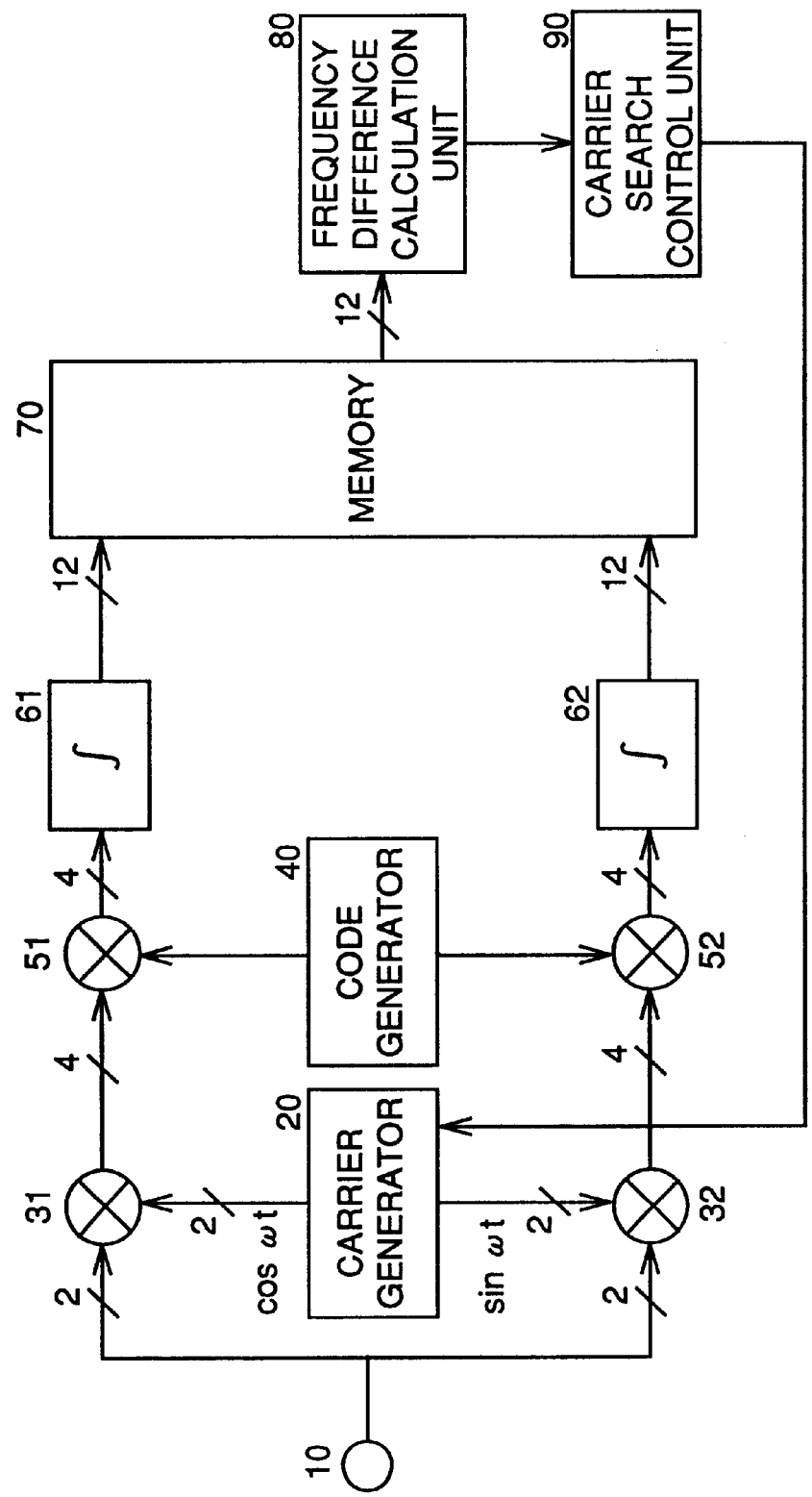
FIG. 6 is a schematic block diagram showing a configuration of a carrier search unit 2000 of a configuration of a conventional GPS receiver.

FIG. 2 is a schematic block diagram illustrating a configuration of the FIG. 1 carrier search unit 1000, as compared with FIG. 6.

Carrier search unit 1000 is distinguished in configuration from conventional carrier search unit 2000 in that, as will be described hereinafter, a frequency calculation unit 80 is replaced with a frequency calculation unit 82, carrier search control unit 90 is replaced with carrier search control unit 92, and in that integrators 61 and 62 are operated under control of carrier search control unit 92. Apart from the above, carrier search unit 1000 is similar in configuration to conventional carrier search unit 2000 and identical portions thereof are denoted by same reference characters and a description thereof will not be repeated.

An operation of carrier search unit 1000 is schematically described as follows:

Assume that downconversion unit 102 has an A-D converter also adapted to have a sampling frequency, e.g., of 4.092 MHz.

Also, local carrier generator 20, carrier multipliers 31 and 32, code generator 40, code multipliers 51 and 52, and integrators 61 and 62 operate according to a clock of 4.092 MHz.

Local carrier generator 20 outputs 2-bit, in-phase and quadrate carriers for each cycle. Carrier multipliers 31 and 32 multiply a 2-bit input signal by the 2-bit, in-phase or quadrate carrier for each cycle to output a 4-bit signal. Code generator 40 generates a 1-bit signal for each cycle that corresponds to a specific GPS satellite. For each cycle, Code generator 40 generates a code each representing ±1.

Code multipliers 51 and 52 multiply a 4-bit signal input by a 1-bit code for each cycle to output a 4-bit signal. For a code of +1, Code multipliers 51 and 52 output a received 4-bit signal as it is. For a code of −1, they invert a received 4-bit signal before it is output.

Integrators 61 and 62 has an integration time of approximately 31 $\mu$sec (128 cycles). At the start of the integration time, integrators 61 and 62 have their internal accumulators initialized to zero and integrators 61 and 62 add a 4-bit input to the accumulators for each cycle. At the end of the integration time, integrators 61 and 62 write the accumulators' values to memory 70.

When 32 integrals for each of the in-phase and quadrate channels are stored in memory 70, frequency difference calculation unit 80 reads the values of the integrals to perform an FFT.

In performing the FFT, an integral for the in-phase channel is regarded as a real part of a time-region signal to perform a 32-point real FFT.

More specifically, when an integral for an in-phase channel and that for an quadrate channel are represented as $I(n)$ and $Q(n)$, respectively, wherein n represents a natural number and n=0, 1, 2, ..., 31, then a signal of a frequency region is obtained as below:

$$X(n)=\Sigma I(k)\exp(-jkn/32) \quad (1)$$

With $XC(n)=I(n)+jQ(n)$, description will now be made of how a signal component contained in $XC(n)$ appears as a signal of a frequency region, according to expression (1).

When $XC(n)$ is a sinusoidal wave of an initial phase $\theta$ at a frequency of $\omega$ kHz, $XC(n)$ and $I(n)$ are represented as below:

$$XC(n)=A\exp(j(n\omega/32+\theta)) \quad (2)$$

$$I(n)=A/2\{\exp(j(n\omega/32+\theta))+\exp(-j(n\omega32+\theta))\} \quad (3)$$

When expression (3) is inserted in expression (1), $$X(n)=16A[\Sigma\{\exp(j(k(\omega-n)/32+\theta))+\exp(-j(k(\omega+n)/32+\theta))\}] \quad (4)$$

When $\omega$ is an integer, in expression (4) at the second term a constant sum of zero is provided with respect to k for n≠0.

Meanwhile the first term constantly provides a sum of zero for $\omega$≠n. That is, expression (4) has a value as below:

i) for $\omega$=0, $$X(0)=32A\cos\theta \quad (5)$$

$$X(n)=0, \text{ wherein } n=1, 2, \ldots, 31 \quad (6)$$

ii) for $\omega$≠0

$$X(n)=16A(\exp(j\theta)), \text{ wherein } n=\omega \quad (7)$$

$$X(n)=0, \text{ wherein } n\neq\omega \quad (8)$$

Thus, for $\omega$=n, a power of an n-kHz frequency component as a result of real FFT is:

$$P(0)=1024A^2\cos^2\theta$$

$$P(n)=256A^2, \text{ wherein } n\neq0$$

That is, only for $\omega$=0 a power appearing at 0 kHz depends on an initial phase of $XC(n)$.

To correct it, Q0 is initially defined by the following expression:

$$Q0=\Sigma Q(k)=32A\Sigma\sin(k\omega/32+\theta)$$

With Q0 used, when $X'(0)=\frac{1}{2}\{X(0)+jQ0\}$ is used in place of $X(0)$ then a power of a 0-kHz frequency component as a result of real FFT is:

$$X'(0)=16A(\exp(j\theta)), \text{ wherein } \omega=0$$

$$X'(0)=0, \text{ wherein } \omega\neq0$$

That is, dissimilar to expressions (5) and (6), a power for $\omega$=0 that is similar to that for expressions (7) and (8) for $\omega$≠0 appears at a frequency corresponding to n=$\omega$.

Figure 3:
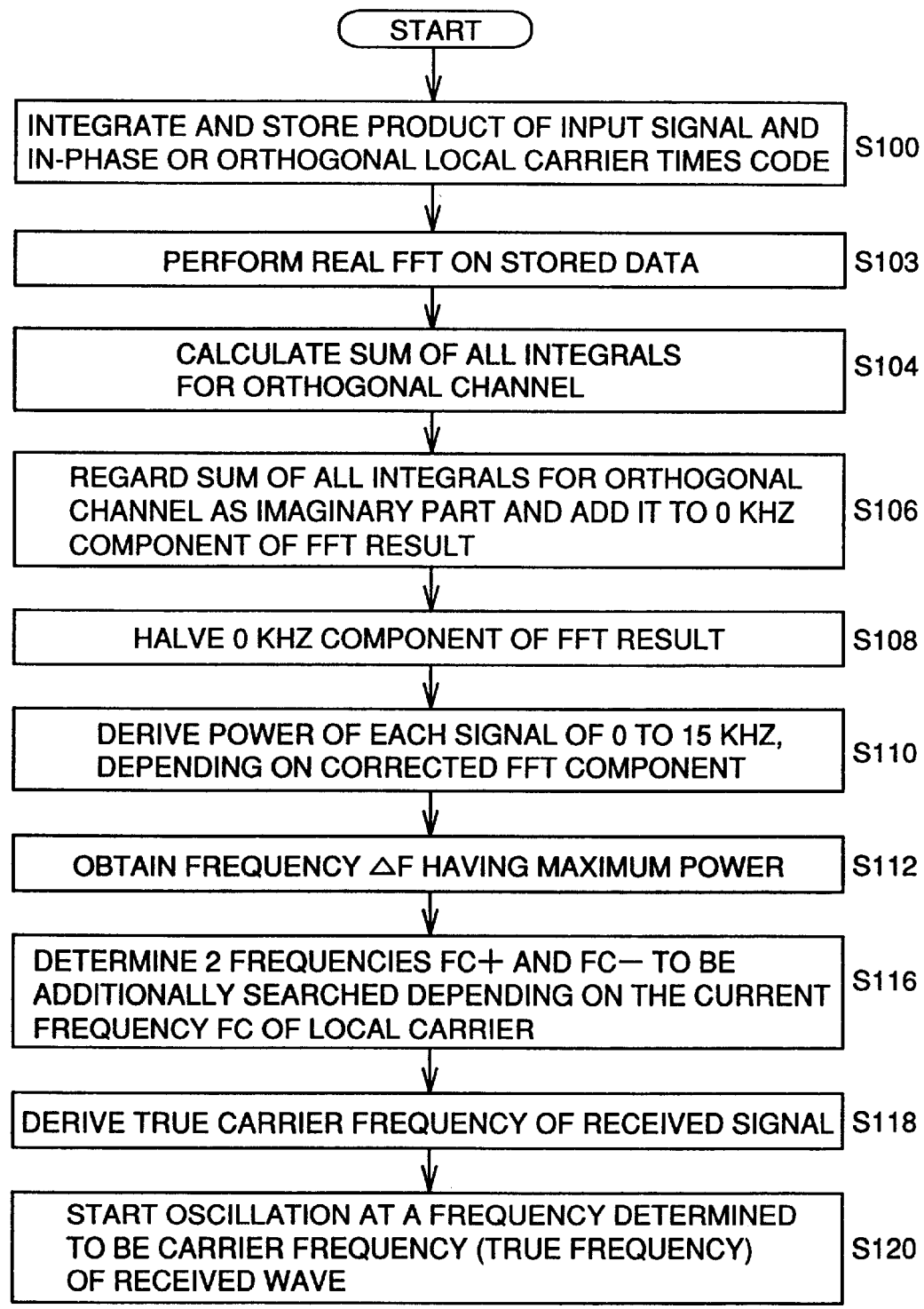
FIG. 3 is a flow chart representing an operation of frequency difference calculation unit 82 and carrier search control unit 92 of the first embodiment.

FIG. 3 is a flow chart representing an operation of carrier search unit 1000 of the first embodiment, particularly that of frequency difference calculation unit 82 and carrier search control unit 92.

Initially the product of an input signal and an in-phase local carrier is multiplied by a code and the product of an input signal and an quadrate local carrier is multiplied by a code. Each multiplication is integrated for a predetermined number of cycles (e.g., 128 cycles) and a predetermined number (e.g., 32) of such integrals are stored in memory 70 (step S100).

Frequency calculation unit 82 regards the 32 integrals for an in-phase channel as real units of time-region signals to perform a 32-point, real FFT (step S103).

Then is obtained a sum of all the 32 integrals for an quadrate channel (step S104).

The sum obtained at step S104 is added as an imaginary part to a 0-kHz component as a result of FFT that is obtained by (1) (step S106).

The 0-kHz component obtained at step S106 is halved (step S108).

A FFT component corrected as above is used to calculate a power for each signal of 0 to 15 kHz (step S110).

The power calculated at step S110 is used to calculate a frequency $\Delta f$ with a power maximized (step S112).

Frequency difference calculation unit 82 sends frequency $\Delta f$ with a power maximized, to carrier search control unit 92. Carrier search control unit 92 uses frequency $\Delta f$ fed from frequency calculation unit 82 and a current frequency fc of a local carrier generated by carrier generator 20, to determine two frequencies $F_{C+}$ and $F_{C-}$ to be additionally searched, as below (step S116):

$$F_{C+}=fc+\Delta f$$

$$F_{C-}=fc-\Delta f$$

In applying real FFT to estimate a frequency two estimated values are used, as above, since real FFT is dissimilar to complex FFT in that a frequency difference has an undetermined sign.

When the above estimated values are obtained, carrier search control unit 92 controls carrier generator 20 and integrators 61 and 62 to obtain a true carrier frequency of a received signal, as described below (step S118).

Controlled by carrier search control unit 92, carrier generator 20 starts to oscillate at a frequency determined to be a carrier frequency (a true frequency) of a received wave (step S120).

Figure 4:
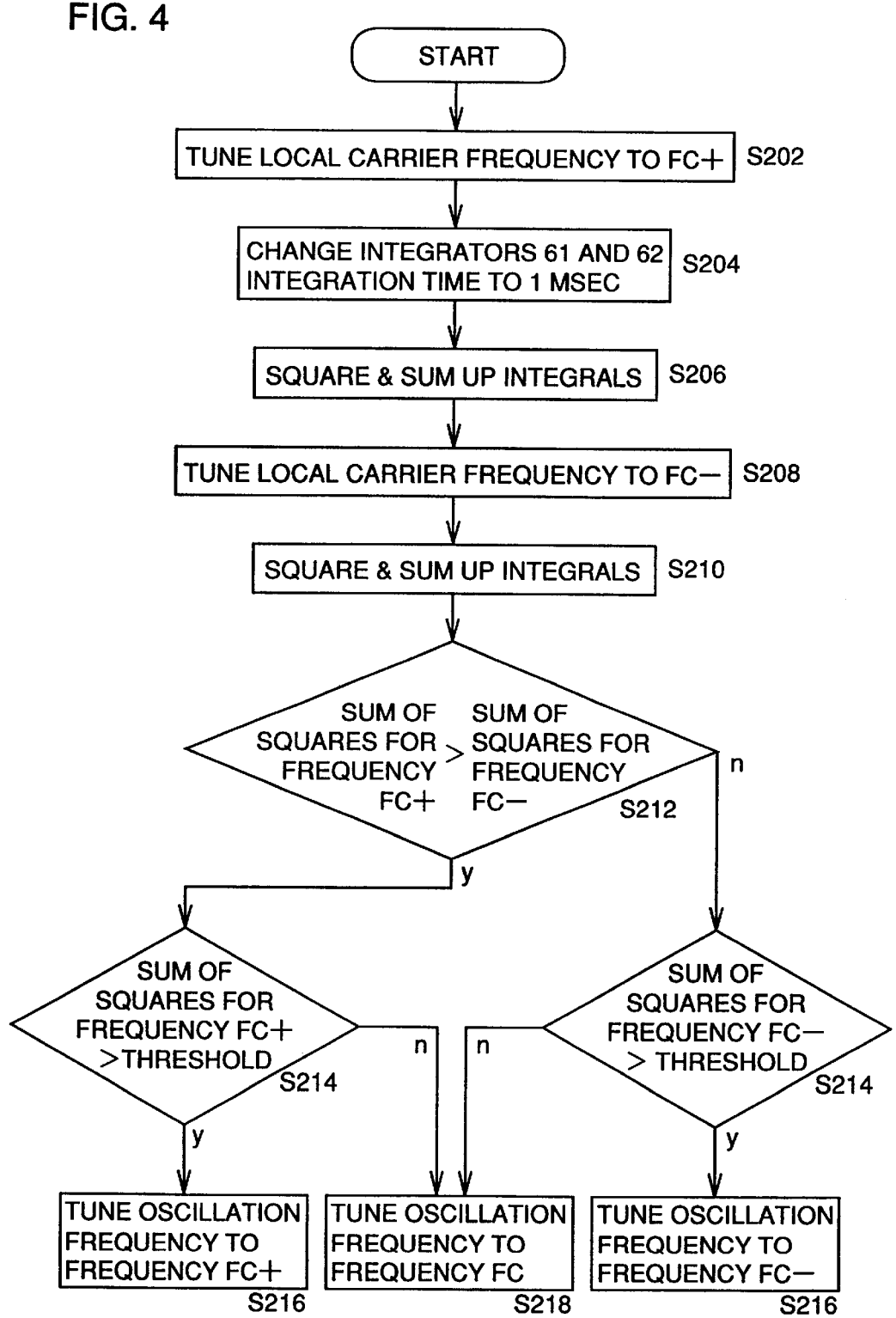
FIG. 4 is a flow chart more specifically illustrating a process step (step 118) performed by carrier search unit 92.

FIG. 4 is a flow chart more specifically representing a process (step S118) provided by carrier search unit 92.

Initially carrier search unit 92 sets to $F_{C+}$ a local carrier frequency generated by carrier generator 20 (step S202). Then carrier search unit 92 varies the integrators 61 and 62 integration period, e.g., to 1 msec (step S204). The increased integration period can enhance the sensitivity provided to measure the frequency difference between an updated local carrier frequency and a carrier frequency of a received wave.

When integrators 61 and 62 each store one integral into memory 70, frequency difference calculation unit 82 reads the integrals and squares each and sums up the squares (step S206).

Then carrier search control unit 92 sets to $F_{C-}$ a local carrier frequency generated by carrier generator 20 (step S208).

When integrators 61 and 62 each store one integral into memory 70, frequency difference calculation unit 82 reads the integrals and squares each and sums up the squares (step S210).

Frequency difference calculation unit 82 compares the sums of the squares of the integrals from integrators 61 and 62 for the two set frequencies $F_{C+}$ and $F_{C-}$ (step S212) and if the larger value of the sums exceeds a predetermined threshold value (step S214) then frequency difference calculation unit 82 determines that the current frequency is the true frequency and outputs the frequency to carrier search control unit 92.

Carrier search control unit 92 re-sets the frequency received from frequency difference calculation unit 82 as an oscillation frequency of carrier generator 20 (step S216).

If neither one of the sums exceeds the threshold value (step S214), then carrier search control unit 92 re-sets the initial frequency fc in carrier generator 20 and re-sets the integrators 61 and 62 integration time to 31 μsec (step S218).

By providing the above process, with carrier search control unit 92 controlling integrators 61 and 62 and carrier generator 20, the amount of the frequency difference calculation process can be reduced.

For example, when a 32-bit, incorporated microprocessor is used to provide the frequency difference calculation process, the conventional GPS receiver 2000 configuration provides a processing amount of approximately 3.2 MIPS to execute a 32-point complex FFT for each millisecond whereas GPS receiver 1000 of the first embodiment, replacing complex FFT with real FFT, can provide a reduced processing amount of approximately 1.7 MIPS. The processing amount corresponds to each GPS satellite to be searched simultaneously. For example when it is applied to a receiver searching eight satellites a processing amount of approximately 26 MIPS can be reduced to approximately 14 MIPS.

Second Embodiment

Figure 5:
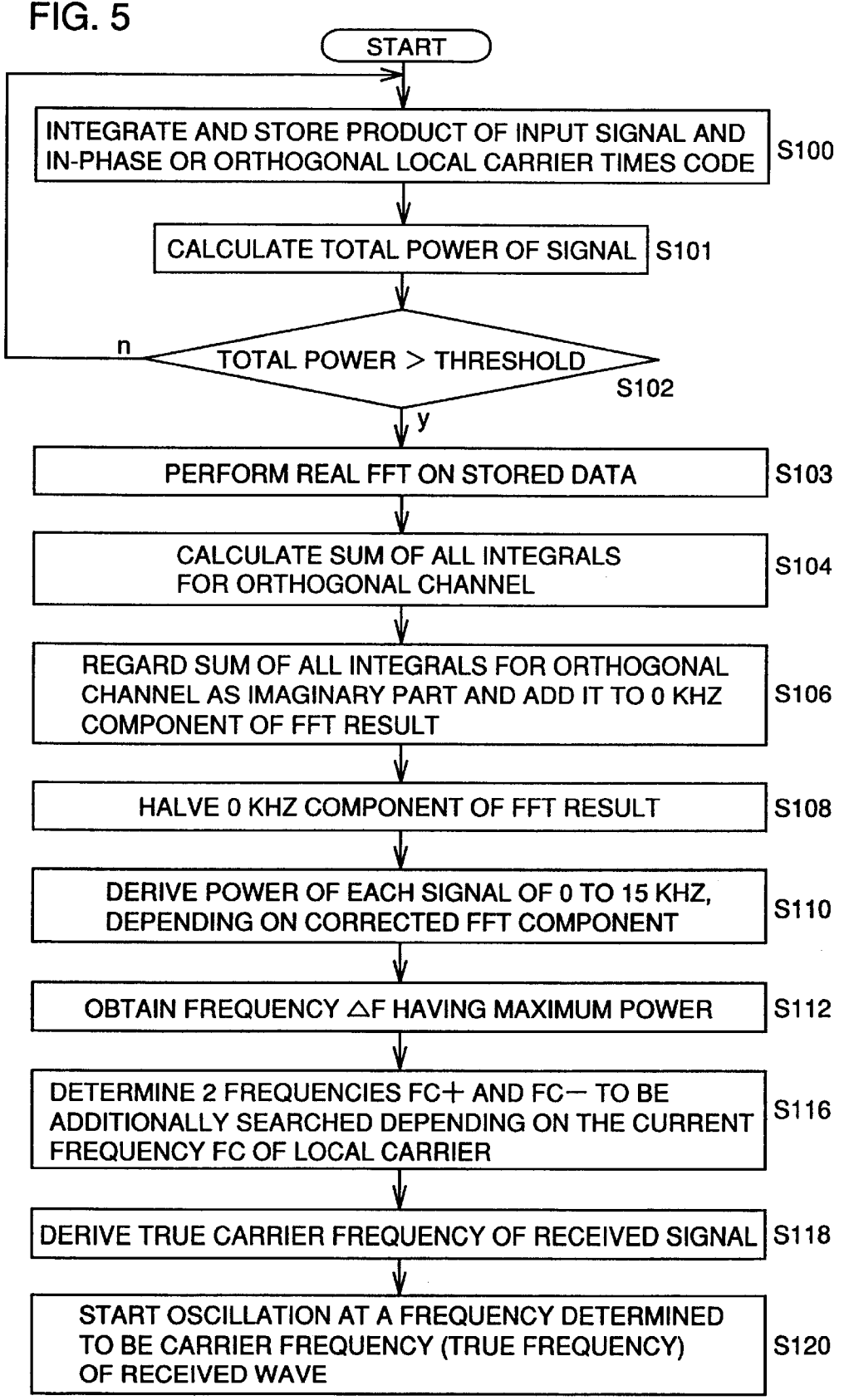
FIG. 5 is a flow chart illustrating an operation of frequency difference calculation unit 82 and carrier search control unit 92 of a second embodiment.

FIG. 5 is a flow chart representing an operation of carrier search unit 1000 of a second embodiment of the present invention, particularly that of frequency difference calculation unit 82 and carrier search control unit 92.

The GPS receiver of the second embodiment is generally similar in configuration to GPS receiver 1000 of the first embodiment, except that steps S101–S102 shown in FIG. 5 are provided by frequency difference calculation unit 82.

More specifically, frequency difference calculation unit 82 reads from memory 70 the 32 integrals corresponding to an in-phase channel and those corresponding to an quadrate channel and then calculates the total power thereof, as below (step S101):

$$P0 = \Sigma\{(I(k))^2 + (Q(k))^2\}$$

Then frequency difference calculation unit 82 determines whether total power P0 exceeds a threshold value for a predetermined total power (step S102).

If total power P0 exceeds the predetermined threshold value, the subsequent steps are provided as in the first embodiment.

If total power P0 does not exceed the predetermined threshold value, the process returns to step S100 to allow frequency difference calculation unit 82 to wait until 32 integrals for the in-phase channel and that for the quadrate channel are again stored in memory 70.

Such steps S101–S102 are added in order to utilize the fact that total power P0 has a power reduced due to a characteristic of a pseudo random code when a code generated by code generator 40 is not in phase with a code included in an input signal. Thus, in addition to the effect of GPS receiver 1000 of the first embodiment, only when it is highly possible that the codes are phased the subsequent process steps can be performed to further reduce the total amount of process.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A positioning device receiving positioning signals from a plurality of satellites to derive positional information, comprising:

a downconversion unit receiving positioning signals from said plurality of satellites and converting the positioning signals to a predetermined intermediate-frequency signal;

a plurality of carrier search units receiving an output from said downconversion unit to search for a frequency of a carrier wave of the positioning signals from the plurality of satellites, each of said carrier search units including a carrier generator generating an in-phase local carrier signal and a quadrate local carrier signal, a signal extraction unit using the predetermined intermediate-frequency signal from said downconversion unit and signals output from said carrier generator to separate an in-phase channel signal corresponding to said in-phase local carrier signal and a quadrate channel signal corresponding to said quadrate local carrier signal, and performing spectrum despread, first and second integrators each receiving a corresponding one of outputs from said signal extraction unit and integrating the corresponding output for a designated integration time, a storage circuit holding a plurality of integrals from said first and second integrators, each of said plurality of integrals being calculated for each said integration time, a frequency difference calculation unit deriving a frequency difference between a carrier frequency in the signal from said downconversion unit and a local carrier frequency, said frequency difference calculation unit deriving said frequency difference by i) providing Fast Fourier Transform for the integration stored in said storage circuit and corresponding to said in-phase channel signal, ii) correcting a direct-current component of frequency components obtained by the Fast Fourier Transform using the integration stored in said storage circuit and corresponding to said quadrate channel signal, and iii) selecting a frequency component with a maximum power among the frequency components, and a carrier search control unit using said frequency difference to update the frequency of said local carrier signals generated by said carrier generator, to search for the frequency of said carrier wave; and a positional information deriving unit using an output from said carrier search unit to extract navigation messages from the positioning signals from said plurality of satellites to derive positional information.

2. The positioning device according to claim 1, wherein said frequency difference calculation unit:

said frequency difference calculation unit corrects the direct-current component by adding an imaginary part to the direct-current component, a sum of the integrals stored in said storage circuit and corresponding to said quadrate channel signal being applied as the imaginary part, calculates a power of each of said frequency components, and provides said frequency difference based on the frequency with the maximum power.

3. The positioning device according to claim 2, wherein said signal extraction unit includes:

a carrier multiplier multiplying a signal from said down-conversion unit by a respective one of said in-phase and quadrate local carriers generated by said carrier generator, to generate said in-phase and quadrate channel signals;

a code generator generating a code signal corresponding to a specific one of said plurality of satellites; and a code multiplier multiplying an output from said code generator by respective one of said in-phase and quadrate channel signals.

4. The positioning device according to claim 2, wherein said frequency difference calculation unit multiplies the sum of the integrals stored in said storage circuit and corresponding to said quadrate cannel signal and the direct-current component of frequency components resulting from said Fast Fourier Transform by a predetermined coefficient to correct the direct-current component resulting from said Fast Fourier Transform.

5. The positioning device according to claim 2, wherein said carrier search control unit sets a frequency of said local carrier depending on integrals from said first and second integrators when a first estimated frequency equal to a carrier frequency being generated by said carrier generator plus said frequency difference and a second estimated frequency equal to the carrier frequency being generated by said carrier generator minus said frequency difference are each set as said carrier frequency.

6. The positioning device according to claim 2, wherein when a predetermined threshold is exceeded by a sum of a predetermined number of integrals stored in said storage circuit and corresponding to said in-phase channel signal each squared and then together summed up and a predetermined number of integrals stored in said storage circuit and corresponding to said quadrate channel signal each squared and then together summed up, said frequency difference calculation unit uses the integrals stored in said storage circuit and corresponding to said in-phase channel signal to provide Fast Fourier Transform and regards a sum of all the integrals stored in said storage circuit and corresponding to said quadrate channel signal as the imaginary part of the direct-current component of frequency components resulting from said Fast Fourier Transform, to calculate the power for each of said frequency components.

7. A positioning method receiving a signal from a plurality of satellites to derive positional information, comprising the steps of:

receiving a signal from said plurality of satellites and converting said signal to a signal of a predetermined intermediate-frequency;

multiplying said intermediate-frequency signal by an in-phase carrier signal and a quadrate carrier signal to separate an in-phase channel signal corresponding to said in-phase local carrier signal and a quadrate channel signal corresponding to said quadrate local carrier signal;

despreading a spectrum of each of said in-phase and quadrate channel signals;

integrating said signals each having the despread spectrum for a respective predetermined integration time;

providing Fast Fourier Transform for the integration corresponding to said in-phase channel signal;

correcting a direct-current component of frequency components obtained by the Fast Fourier Transform using the integration corresponding to said quadrate channel signal;

selecting a frequency component with a maximum power among the frequency components to provide said frequency difference;

using said frequency difference to update a frequency of said in-phase and quadrate carrier signals to search for a frequency of said carrier wave;

using said carrier wave searched, to extract navigation messages from the signals from said plurality of satellites to derive positional information.

8. The positioning method according to claim 7, the step of correcting includes the step of multiplying a sum of the integrals corresponding to said quadrate channel signal and a direct-current component of frequency components resulting from said Fast Fourier Transform by a predetermined coefficient to correct said direct-current component resulting from said Fast Fourier Transform.

9. The positioning method according to claim 7, wherein the step of integrating is followed by the step of determining whether the step of providing Fast Fourier Transform is to be followed depending on whether a predetermined threshold is exceeded by a sum of a predetermined number of integrals corresponding to said in-phase channel signal each squared and then together summed up and a predetermined number of integrals corresponding to said quadrate channel signal each squared and then together summed up.

* * * * *